United States Patent
Leung et al.

(10) Patent No.: US 7,532,646 B2
(45) Date of Patent: May 12, 2009

(54) DISTRIBUTED MULTIPLE-CHANNEL ALIGNMENT SCHEME

(75) Inventors: Wai-Bor Leung, Wescosville, PA (US); Barry Britton, Allentown, PA (US); Akila Subramaniam, Dallas, TX (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 650 days.

(21) Appl. No.: 11/064,477

(22) Filed: Feb. 23, 2005

(65) Prior Publication Data

US 2006/0187966 A1    Aug. 24, 2006

(51) Int. Cl.
*H04J 3/06* (2006.01)
*H04J 3/02* (2006.01)

(52) U.S. Cl. ...................... 370/503; 370/537
(58) Field of Classification Search ................. 370/503, 370/537
See application file for complete search history.

(56) References Cited

U.S. PATENT DOCUMENTS

| | | | | |
|---|---|---|---|---|
| 3,890,469 | A * | 6/1975 | Kelly et al. ................. | 370/369 |
| 5,003,558 | A | 3/1991 | Gregg | |
| 5,268,903 | A | 12/1993 | Jones | |
| 6,049,552 | A * | 4/2000 | Song ......................... | 370/503 |
| 6,160,819 | A * | 12/2000 | Partridge et al. ............ | 370/474 |
| 6,618,395 | B1 * | 9/2003 | Kimmitt ..................... | 370/473 |
| 6,643,752 | B1 * | 11/2003 | Donnelly et al. ............ | 711/167 |
| 6,750,675 | B2 * | 6/2004 | Venkata et al. .............. | 326/41 |
| 6,917,366 | B1 | 7/2005 | West | |
| 6,959,015 | B1 * | 10/2005 | Hwang et al. ............... | 370/516 |
| 6,963,223 | B2 * | 11/2005 | Venkata et al. .............. | 326/41 |
| 6,993,671 | B2 * | 1/2006 | Pricer et al. ................. | 713/400 |
| 7,065,103 | B1 * | 6/2006 | Gagnon et al. .............. | 370/474 |
| 7,136,388 | B2 * | 11/2006 | Friedrichs et al. ...... | 370/395.62 |
| 7,227,875 | B2 * | 6/2007 | Deng ......................... | 370/474 |
| 7,272,677 | B1 * | 9/2007 | Venkata et al. .............. | 710/71 |
| 2001/0000701 | A1 | 5/2001 | Carneheim | |
| 2002/0122435 | A1 * | 9/2002 | Mundkur et al. ............ | 370/503 |
| 2003/0149987 | A1 | 8/2003 | Pasqualino | |

OTHER PUBLICATIONS

ORCA ORSO42G5 and ORSO82G5 Data Sheet, Version 05, Aug. 2004, pp. 1-74, Lattice Semiconductor Corporation.
ORCA ORT42G5 and ORT82G5 Data Sheet, Version 04, Aug. 2004, pp. 1-56, Lattice Semiconductor Corporation.
Virtex-II Pro and Virtex-II Pro X Platform FPGAs: Complete Data Shhet, Version 4.1, Nov. 2004, pp. 1-60, Xilinx Corporation.

* cited by examiner

*Primary Examiner*—Alpus H Hsu

(57) ABSTRACT

A channel-alignment circuit has a controller and a plurality of channel-alignment blocks. Each channel-alignment block synchronizes two or more channels. The controller coordinates the synchronization of channels by the blocks such that (i) channels in each of one or more groups of two or more blocks are synchronized, and (ii) each group of blocks is synchronized independently of any other group.

23 Claims, 8 Drawing Sheets

FIG. 2

| TABLE I. CHANNEL-ALIGNMENT OPERATING MODES | | | | |
|---|---|---|---|---|
| MODE | GROUP 0 | GROUP 1 | GROUP 2 | GROUP 3 |
| 1 | 8 quads | NOT USED | NOT USED | NOT USED |
| 2 | 7 quads | NOT USED | NOT USED | NOT USED |
| 3 | 6 quads | 2 quads | NOT USED | NOT USED |
| 4 | 6 quads | NOT USED | NOT USED | NOT USED |
| 5 | 5 quads | 3 quads | NOT USED | NOT USED |
| 6 | 5 quads | 2 quads | NOT USED | NOT USED |
| 7 | 5 quads | NOT USED | NOT USED | NOT USED |
| 8 | 4 quads | 4 quads | NOT USED | NOT USED |
| 9 | 4 quads | 3 quads | NOT USED | NOT USED |
| 10 | 4 quads | 2 quads | 2 quads | NOT USED |
| 11 | 4 quads | 2 quads | NOT USED | NOT USED |
| 12 | 4 quads | NOT USED | NOT USED | NOT USED |
| 13 | 3 quads | 3 quads | 2 quads | NOT USED |
| 14 | 3 quads | 3 quads | NOT USED | NOT USED |
| 15 | 3 quads | 2 quads | 2 quads | NOT USED |
| 16 | 3 quads | 2 quads | NOT USED | NOT USED |
| 17 | 3 quads | NOT USED | NOT USED | NOT USED |
| 18 | 2 quads | 2 quads | 2 quads | 2 quads |
| 19 | 2 quads | 2 quads | 2 quads | NOT USED |
| 20 | 2 quads | 2 quads | NOT USED | NOT USED |
| 21 | 2 quads | NOT USED | NOT USED | NOT USED |
| 22 | NOT USED | NOT USED | NOT USED | NOT USED |

DISTRIBUTED MULTIPLE-CHANNEL ALIGNMENT SCHEME

TECHNICAL FIELD

The present invention relates to signal processing, and, in particular, to schemes for synchronizing multiple data channels, e.g., for combination into a single, higher-speed data channel.

BACKGROUND

In high-speed communication, it is quite common to place the data from one data stream into several slower data streams, for example, for transmission over cables or a backplane to another circuit board. During transmission, the data streams may incur different path delays. As such, a channel-alignment process may be needed to synchronize the different low-speed data streams before they can be recombined into a single high-speed data stream. In the SONET/SDH standard, a frame pulse may be used as an alignment signal, while other packet transmission protocols may rely on other mechanisms, such as a programmable code group, as an alignment signal.

According to one traditional approach, channel alignment is accomplished by designing a dedicated alignment circuit (e.g., implemented using ASIC-type circuitry) for each group of channels to be synchronized. In one exemplary prior-art architecture that supports up to eight different low-speed channels, there are seven alignment circuits: one 8-channel alignment circuit, two 4-channel alignment circuits, and four 2-channel alignment circuits. The seven alignment circuits can support the following different modes of operation:

Synchronize all eight channels using the 8-channel alignment circuit.

Synchronize four channels using one of the 4-channel alignment circuits, while synchronizing the other four channels using the other 4-channel alignment circuit.

Synchronize four channels using one of the 4-channel alignment circuits, synchronize another two channels using one of the 2-channel alignment circuits, and synchronize the remaining two channels using another of the 2-channel alignment circuits.

Use each of the four 2-channel alignment circuits to synchronize a different pair of channels.

While this scheme provides an acceptable solution when there are only eight channels to be synchronized, the number of alignment circuits needed to support different alignment modes becomes unacceptably large with increasing numbers of channels. For example, for 32 channels, an analogous channel-alignment scheme would require 36 different channel-alignment circuits: one 32-channel circuit, one 28-channel circuit, one 24-channel circuit, one 20-channel circuit, two 16-channel circuits, two 12-channel circuits, four 8-channel circuits, eight 4-channel circuits, and sixteen 2-channel circuits.

Another traditional approach is to use programmable logic (e.g., FPGA-type logic) to implement each different alignment circuit for each different operating mode. While this solution provides the flexibility needed to support any desired channel-synchronization configuration, it does so at the cost of increased die area and processing time associated with FPGA-type programmable logic as opposed to smaller, faster ASIC-type circuitry.

SUMMARY

In one embodiment, the present invention is a channel-alignment circuit comprising a controller and a plurality of channel-alignment blocks. Each channel-alignment block is adapted to synchronize two or more channels. The controller is adapted to coordinate the synchronization of channels by the blocks such that (i) channels in each of one or more groups of two or more blocks are synchronized, and (ii) each group of blocks is synchronized independently of any other group.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 presents Table I, which shows the different channel-alignment operating modes for the channel-alignment circuit of FIG. 1;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Figure 1:
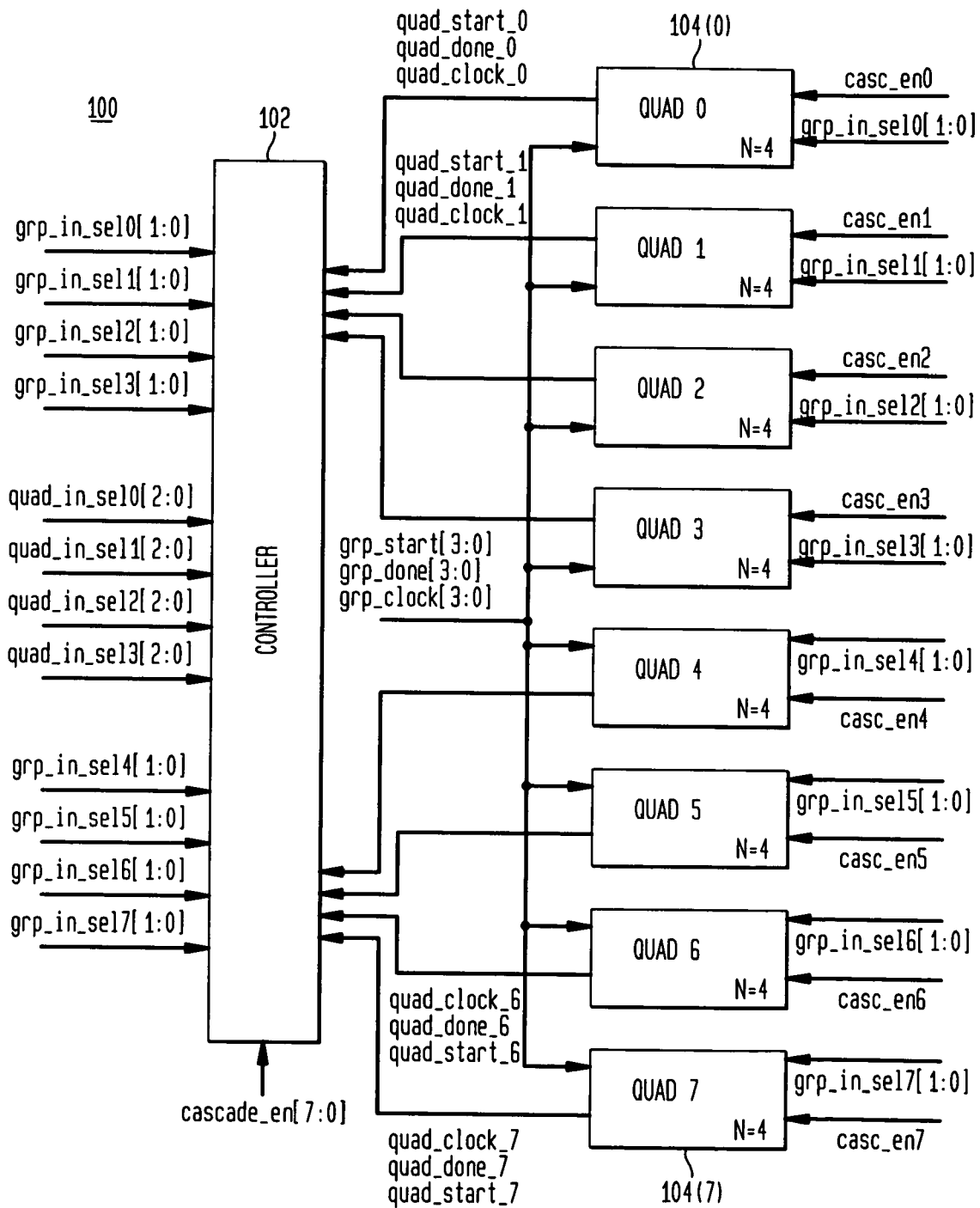
FIG. 1 shows a block diagram of a channel-alignment circuit according to one embodiment of the present invention.

FIG. 1 shows a block diagram of a channel-alignment circuit 100, according to one embodiment of the present invention. Channel-alignment circuit 100 has alignment controller 102 and eight different 4-channel alignment blocks (also referred to herein as "quads") 104(0)-(7), where each quad 104 is capable of synchronizing a different set of four input channels. For simplicity, alignment block 104(0) is also referred to herein as "Quad 0," alignment block 104(1) as "Quad 1," and so on.

While each quad is capable of synchronizing up to four received channels, each quad can also be configured to process fewer than four channels by configuring the quad to ignore one, two, or three of its channels. The remaining channels can be—but do not have to be—part of a multiple-quad alignment group. To increase the flexibility of alignment processing within a quad, a secondary alignment circuit for two channels may also be provided in each quad. In one implementation, if the secondary alignment circuit is used to align two channels, then those two channels cannot be part of a multiple-quad alignment group. The secondary alignment circuit can be used when the quad's primary alignment circuit is programmed to handle fewer than three channels. As such, a quad having a secondary alignment channel can be configured to simultaneously and independently synchronize two different pairs of its input channels: one pair by the quad's primary alignment circuit and the other pair by the quad's secondary alignment circuit.

While each quad can be configured to operate independently from the other quads, controller 102 provides the capability to coordinate the synchronization of channels between two or more different quads. In this case, two or more quads can be considered to form a group of quads, where all of the selected channels in all of the quads in the group are synchronized together. In the particular implementation of FIG. 1, controller 102 supports up to four different groups of quads, where each quad can be independently assigned to none or any of the four groups.

Channel-alignment circuit 100 supports 22 different operating modes in which up to 32 channels are simultaneously synchronized in a variety of combinations of up to four groups of quads as summarized in Table I of FIG. 2. For example, Mode 1 supports a single group: Group 0, in which up to 32 channels in all eight quads are synchronized. Mode 2 also supports a single group: Group 0, in which up to 28 channels in seven of the eight quads are synchronized. Mode 3 supports two groups: Group 0, in which up to 24 channels in six quads are synchronized, and Group 1, in which up to 8 channels in the remaining two quads are synchronized. And so on, until Mode 21, which also supports a single group: Group 0, in which up to 8 channels in two quads are synchronized, and Mode 22, which has no groups of two or more quads.

Note that, for each mode, each quad in a group can be independently configured to process fewer than four channels by configuring the quad to ignore one, two, or three of its input channels. Thus, although Mode 1, for example, can be used to synchronize all 32 channels together, it can, in theory, also be used to configure numbers of channels fewer than 32 by configuring one or more of the quads to ignore one or more of their input channels.

Note that, for a given mode of operation, channels within a group are synchronized with one another, but different channel groups are not synchronized with one another, even though the different groups are simultaneously synchronized. For example, in Mode 8, the up to 16 channels in Group 0 are synchronized with one another, and the up to 16 channels in Group 1 are synchronized with one another, but the channels of Group 0 are not (in general) synchronized with the channels of Group 1. Moreover, different channel groups that are to be aligned simultaneously can be, but do not have to be, clocked by completely asynchronous clocks, thereby allowing asynchronous operation between groups.

Note further that, in many of the operating modes (i.e., Modes 2, 4, 6-7, 9, 11-12, 14-17, and 19-22), one or more of the eight quads are not associated with any groups. During these operating modes, each "non-grouped" quad can be simultaneously operated independently (of the one or more groups and one or more other non-grouped quads) to synchronize (1) up to four of its input channels or (2) two pairs of its input channels. At one extreme, Mode 22 could be implemented with each quad synchronizing two pairs of input channels to provide a total of 16 pairs of synchronized channels. Moreover, although channel-alignment circuit 100 can, in theory, be implemented with one, two, three, or four single-quad groups (i.e., groups having only one quad each), such operations are not needed since individual quads can always be implemented independently without relying on controller 102.

Note further that two or more operating modes may have the same number of groups, but different numbers of quads in those groups. For example, Mode 5 has two groups: Group 0 with 5 quads and Group 1 with 3 quads, and Mode 6 has two groups: Group 0 with 5 quads and Group 1 with 2 quads. These two modes have the same number of groups (i.e., 2), but different numbers of quads in those groups (i.e., 5 and 3 vs. 5 and 2). Note that these two operating modes are said to have different numbers of quads in their groups even though Group 0 in both modes has the same number of quads (i.e., 5).

Note further that, with the exception of Modes 18 and 22, each operating mode listed in Table I could in theory be implemented in a number of different ways. For example, in alternative implementations, Mode 1 could be implemented with Group 1 having all 8 quads, or with Group 2 having all 8 quads, or with Group 3 having all 8 quads. For simplicity, all of these variations are assumed to correspond to a single operating mode in this discussion.

Note further that, in general, operating modes can be implemented with different numbers of quads. For example, while Mode 12 has four quads in a single group, any combination of quads can be assigned to that single group, e.g., Quads 0123, 1234, 0247, etc.

In certain embodiments, each block in each group can be configured such that any one or more selected channels in the group are disabled, while any remaining channels in the group are enabled, where the controller coordinates the synchronization of all enabled channels in each group. During synchronization processing of a group, a block in the group having an enabled channel can be re-configured to disable that channel without adversely affecting the synchronization of other previously enabled channels in the group. In addition, during synchronization processing of a group, a block in the group having a disabled channel can be re-configured to enable that channel, wherein any currently enabled channels in the group are automatically re-aligned.

FIG. 1 also shows a number of different signals transmitted to and from controller 102 and/or quads 104. These various signals are defined as follows:

cascade_en[7:0]: Eight-bit control signal, where each bit corresponds to a different quad and "1" indicates that the corresponding quad is part of a group.

casc_enx: One-bit control signal, where "1" indicates that Quad x is in a group. Note that casc_enx is bit x of cascade_en[7:0].

grp_in_selx[1:0]: Two-bit control signal that indicates which group Quad x is in. For example, group_in_sel5[1:0]=(11) indicates that Quad 5 is in Group 3.

quad_in_sely[2:0]: Three-bit control signal that indicates which of the eight quad clock signals to select for Group y. For example, quad_in_sel3[2:0]=(101) indicates that the clock signal from Quad 5 (i.e., quad_clock_5) is selected to be the clock signal for Group 3.

quad_start_x: One-bit control signal, where "1" indicates that Quad x has received and detected an alignment pulse in at least one of its four input channels.

quad_done_x: One-bit control signal, where "1" indicates that Quad x has received and detected at least one alignment pulse in each of its four input channels.

quad_clock_x: Clock signal recovered by Quad x from one of its four input channels.

grp_start[3:0]: Four-bit control signal, where each bit corresponds to a different group and "1" indicates that an alignment pulse has been received and detected in at least one of the input channels in that group.

grp_done[3:0]: Four-bit control signal, where each bit corresponds to a different group and "1" indicates that at least one alignment pulse has been received and detected in each of the channels in that group.

grp_clock[3:0]: Four group clock signals, each clock signal corresponding to a different group.

For simplicity, FIG. 1, like FIGS. 5-7 below, does not show all of the signals (e.g., the four different input channels, four different output channels, and four different recovered clock signals) associated with each quad.

Figure 3:
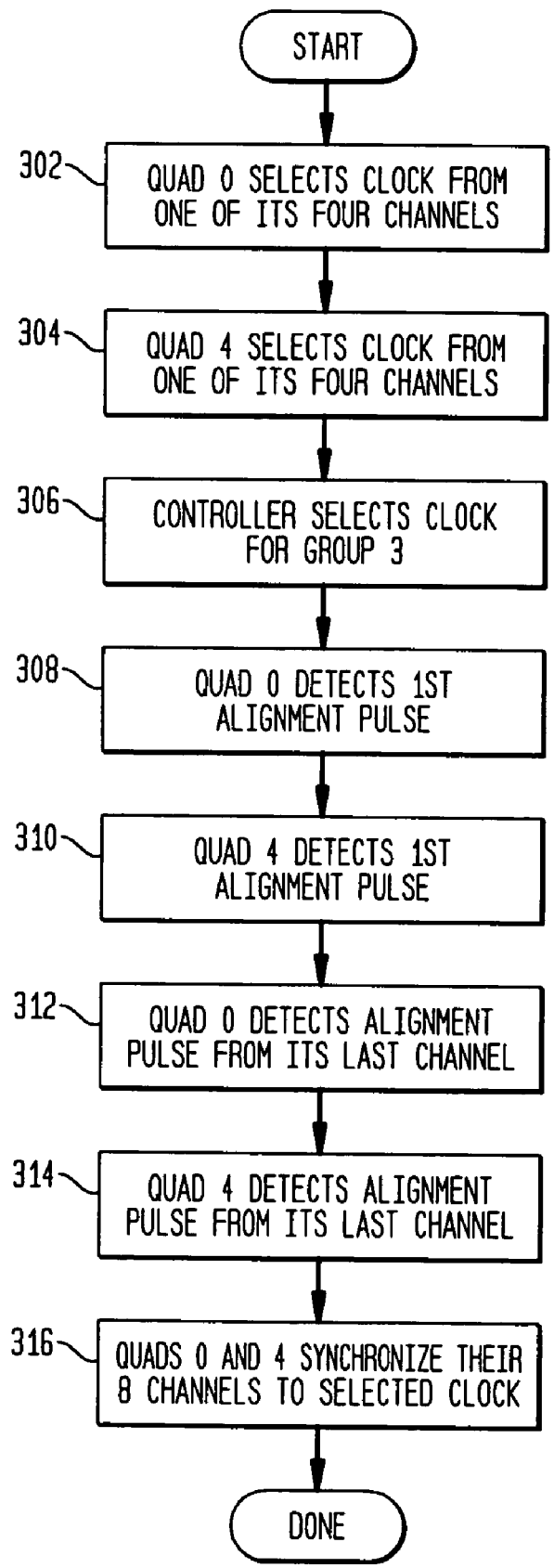
FIG. 3 shows a flow diagram representing one possible processing scenario for the channel-alignment circuit of FIG. 1 for the example of synchronization of Group 3 consisting of the eight channels processed by Quads 0 and 4.
Figure 4:
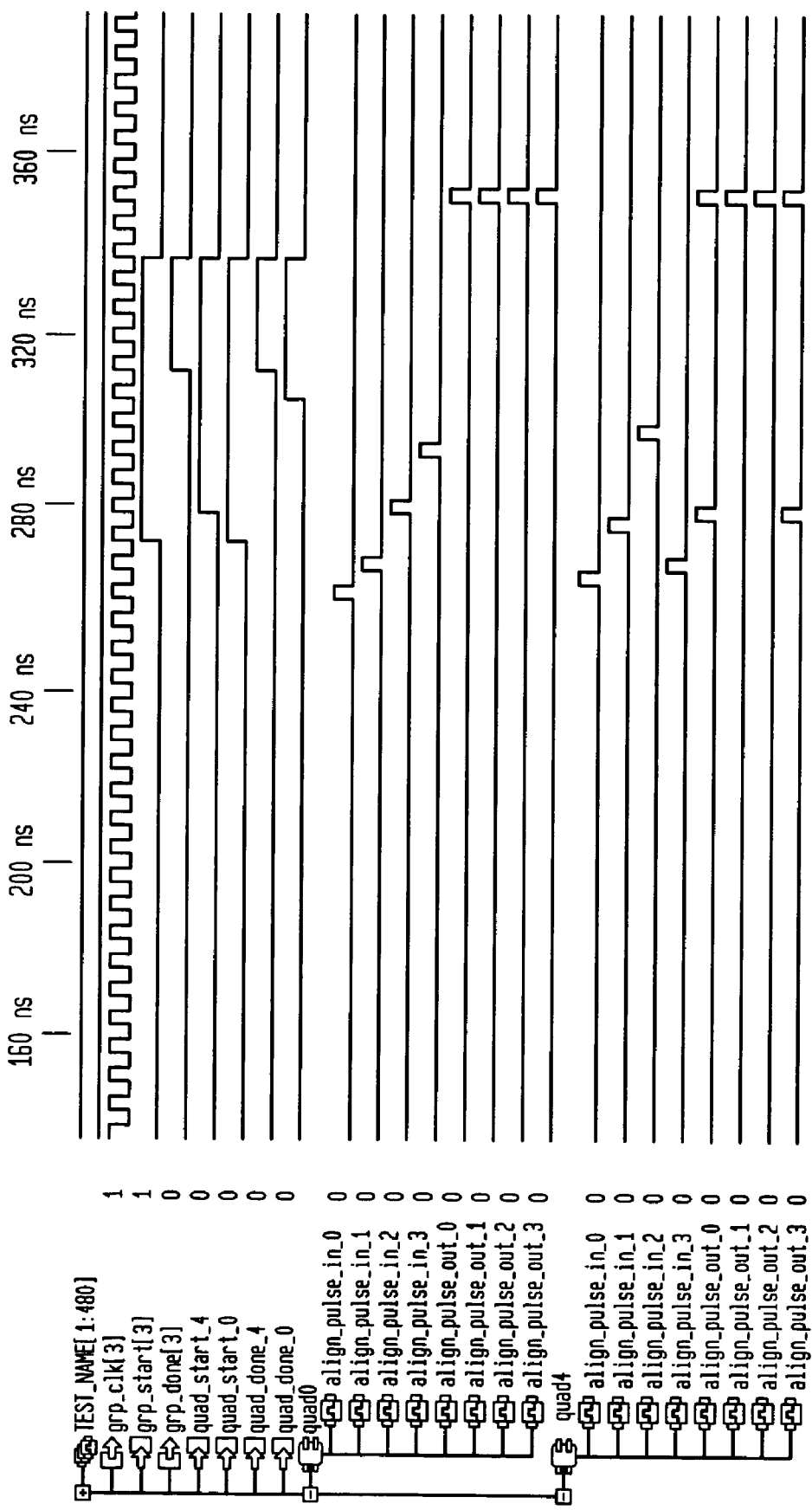
FIG. 4 shows a timing diagram corresponding to the example of FIG. 3.

FIG. 3 shows a flow diagram representing one possible processing scenario for channel-alignment circuit 100 of FIG. 1 for the example of synchronization of Group 3 consisting of Quads 0 and 4. FIG. 4 shows a simulated timing diagram corresponding to the example of FIG. 3 and generated using a zero-delay simulation where signals propagate with zero time delay. Note that this example deals only with Group 3. Channel-alignment circuit 100 may be configured to simultaneously synchronize one, two, or three other groups involving a total of up to 24 other channels, but those groups are not relevant to this example. In FIG. 4:

grp_clk[3] refers to the clock signal of grp_clock[3:0] corresponding to Group 3;

grp_start(3) refers to the bit of grp_start[3:0] corresponding to Group 3;

grp_done(3) refers to the bit of grp_done[3:0] corresponding to Group 3;

For each quad, align_pulse_in_x shows the location of alignment pulses in input channel x of that quad; and For each quad, align_pulse_out_x shows the location of alignment pulses in output channel x of that quad.

Referring again to FIG. 3, at the start of synchronization processing (e.g., prior to the timing diagram of FIG. 4), the relevant control signals have the following values:

cascade_en[7:0]=(xxx1xxx1) indicating that Quad 0 and Quad 4 are each in a group, where ("x" ⇒ "don't care" for this particular example of Group 3).

grp_in_sel0[1:0]=(11) indicating that Quad 0 is in Group 3;

grp_in_sel4[1:0]=(11) indicating that Quad 4 is in Group 3;

quad_start_0="0" indicating that Quad 0 has not received and detected an alignment pulse yet;

quad_start_4="0" indicating that Quad 4 has not received and detected an alignment pulse yet;

quad_done_0="0" indicating that Quad 0 has not received and detected alignment pulses in all four input channels yet;

quad_done_4="0" indicating that Quad 4 has not received and detected alignment pulses in all four input channels yet;

quad_clock_0="x" indicating that Quad 0 has not yet selected a clock signal from one of its four input channels;

quad_clock_4="x" indicating that Quad 4 has not yet selected a clock signal from one of its four input channels;

grp_start[3:0]=(0xxx) indicating that Group 3 has not received and detected an alignment pulse yet;

grp_done[3:0]=(0xxx) indicating that Group 3 has not received and detected alignment pulses in all of its input channels yet;

grp_clock[3:0]=(xxxx) indicating that the controller has not yet selected a clock signal for Group 3; and quad_in_sel3[2:0]=(xxx) indicating that the controller has not yet selected a clock signal for Group 3.

At step 302 of FIG. 3, Quad 0 selects one of the clock signals recovered from its four input channels as quad_clock_0. At step 304, Quad 4 selects one of the clock signals recovered from its four input channels as quad_clock_4. Note that, depending on the particular implementation, the circuitry for recovering the various clock signals from the different input channels may be implemented either internal or external to the corresponding quads. At step 306, controller 102 selects one of quad_clock_0 and quad_clock_4 for use as grp_clk[3] (i.e., the clock for Group 3). This is basically the situation at the start of the timing diagram of FIG. 4.

At step 308, Quad 0 receives its first alignment pulse, in this case, in its input channel 0 (at about 260 ns in FIG. 4). (Note that the times shown in FIG. 4 are intended to designate relative—not absolute—timing. As such, the fact that the first alignment pulse appears at 260 ns is not intended to imply that the overall processing of alignment circuit 100 began only 260 ns prior to the arrival of that first alignment pulse.) Quad 0 detects this first alignment pulse and sets quad_start_0 to "1" (at about 272 ns in FIG. 4). As shown in FIG. 4, immediately after this, controller 102 sets grp_start[3] to "1".

At step 310, Quad 4 receives its first alignment pulse, in this case, in its input channel 0 (at about 264 ns in FIG. 4). Quad 4 detects this first alignment pulse and sets quad_start_4 to "1" (at about 280 ns in FIG. 4).

At step 312, after having already received at least one alignment pulse in three of its four input channels, Quad 0 receives the first alignment pulse in the last of its four input channels, in this case, in its input channel 3 (at about 292 ns in FIG. 4). Quad 0 detects this last alignment pulse and sets quad_done_0 to "1" (at about 304 ns in FIG. 4).

At step 314, after having already received at least one alignment pulse in three of its four input channels, Quad 4 receives the first alignment pulse in the last of its four input channels, in this case, in its input channel 2 (at about 300 ns in FIG. 4). Quad 4 detects this last alignment pulse and sets quad_done_4 to "1" (at about 312 ns in FIG. 4). As shown in FIG. 4, immediately after this, controller 102 sets grp_done [3] to "1".

At step 316, Quads 0 and 4 synchronize their eight channels to the selected group clock, as indicated by the alignment of the eight pulses in the eight different mca_rxd_0_x signals at about 352 ns in FIG. 4.

Figure 5:
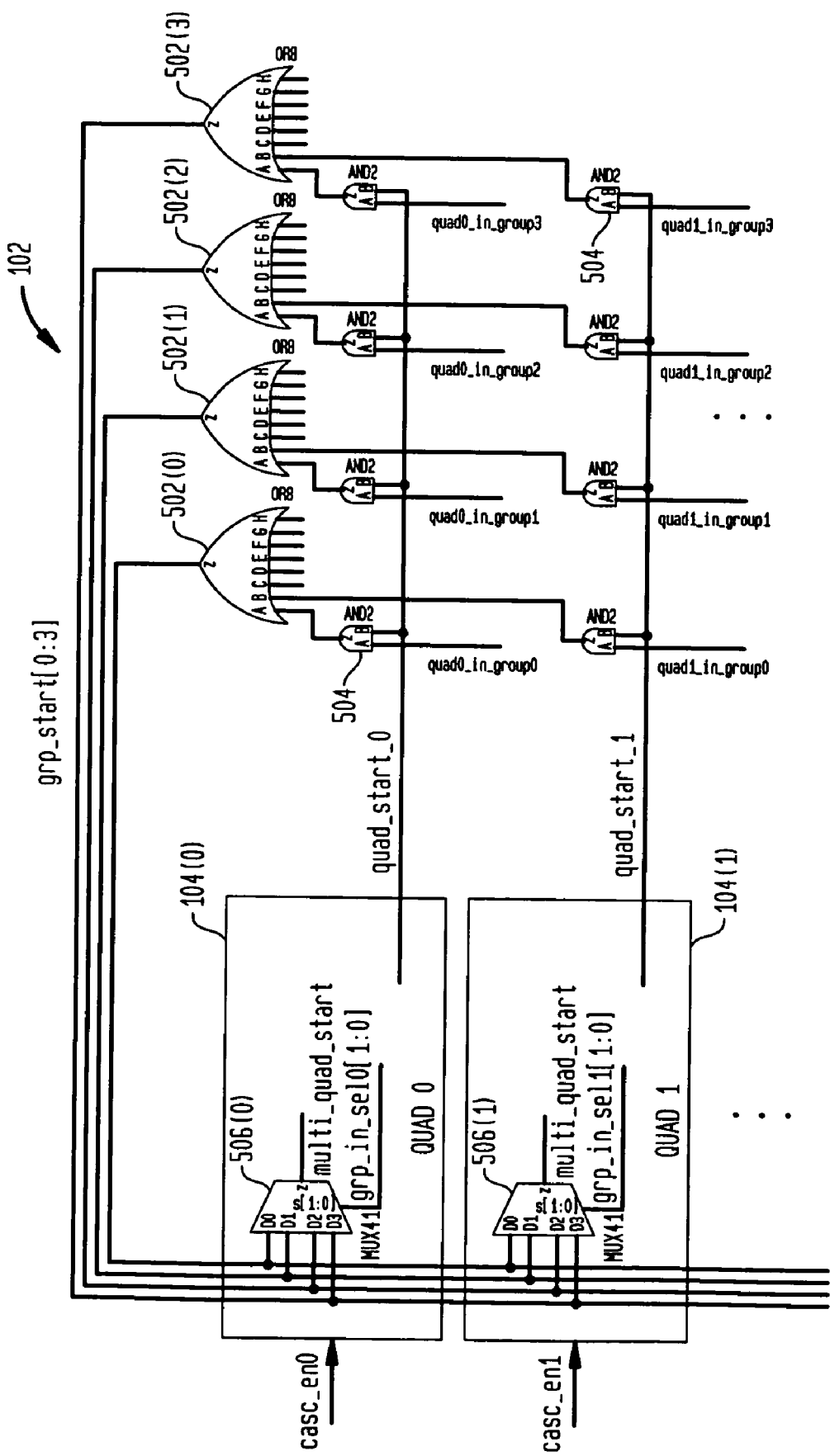
FIG. 5 shows a more-detailed schematic diagram of the circuitry within the controller and the quads of FIG. 1 involved in the generation of the grp_start[3:0] signals.

FIG. 5 shows a more-detailed schematic diagram of the circuitry within controller 102 and quads 104 of FIG. 1 involved in the generation of the grp_start[3:0] signals. In particular, FIG. 5 explicitly shows the circuitry associated with Quad 0 and Quad 1. Although not explicitly depicted, similar circuitry exists for the other six quads.

In addition to signals defined earlier, FIG. 5 also indicates the following signals:

quadx_in_groupy: One-bit control signal, where "1" indicates that Quad x is in Group y. Note that, for a given quad, at most one of the four quadx_in_groupy signals can be a "1" at any given time (although all four can be "0"). For example, if quad0_in_group0 is "1", then quad0_in_group1, quad0_in_group2, and quad0_in_group3 must all be "0".

multi_quad_start: One-bit control signal, internal to each quad, where, if Quad x is part of a group (as indicated by case_enx="1"), then multi_quad_start="1" indicates that an alignment pulse has been received and detected in at least one of the input channels in that group. If Quad x is not part of a group (as indicated by case_enx="0"), then Quad x ignores the value of multi_quad_start.

To support the generation of the grp_start[3:0] signals, controller 102 has four 8-input OR gates 502(0)-(3) (one for each of the four different possible groups) and thirty-two 2-input AND gates 504 (four for each quad, eight for each group, and only eight of which are explicitly depicted in FIG. 5), and each quad 104 has a (4×1) multiplexer (mux) 506.

As shown in FIG. 5, for Quad x, each AND gate 504 receives quad_start_x from Quad x and the corresponding quadx_in_groupy. Since, for Quad x, at most one value of quadx_in_groupy can be "1", when quad_start_x="1", at most one of the four AND gates associated with Quad x will pass the value of quad_start_x to the corresponding OR gate 502. If any of the eight inputs of an OR gate 502 is "1", then the output of that OR gate will also be "1". Each OR gate 502 generates a different corresponding bit of grp_start[3:0]. Thus, a bit of grp_start[3:0] is asserted when any of the quad_start signals is asserted for the quads in the corresponding group. Within each quad, the four bits of grp_start[3:0] are applied to the four inputs of mux 506, which generates multi_quad_start based on the value of grp_in_selx[1:0].

Figure 6:
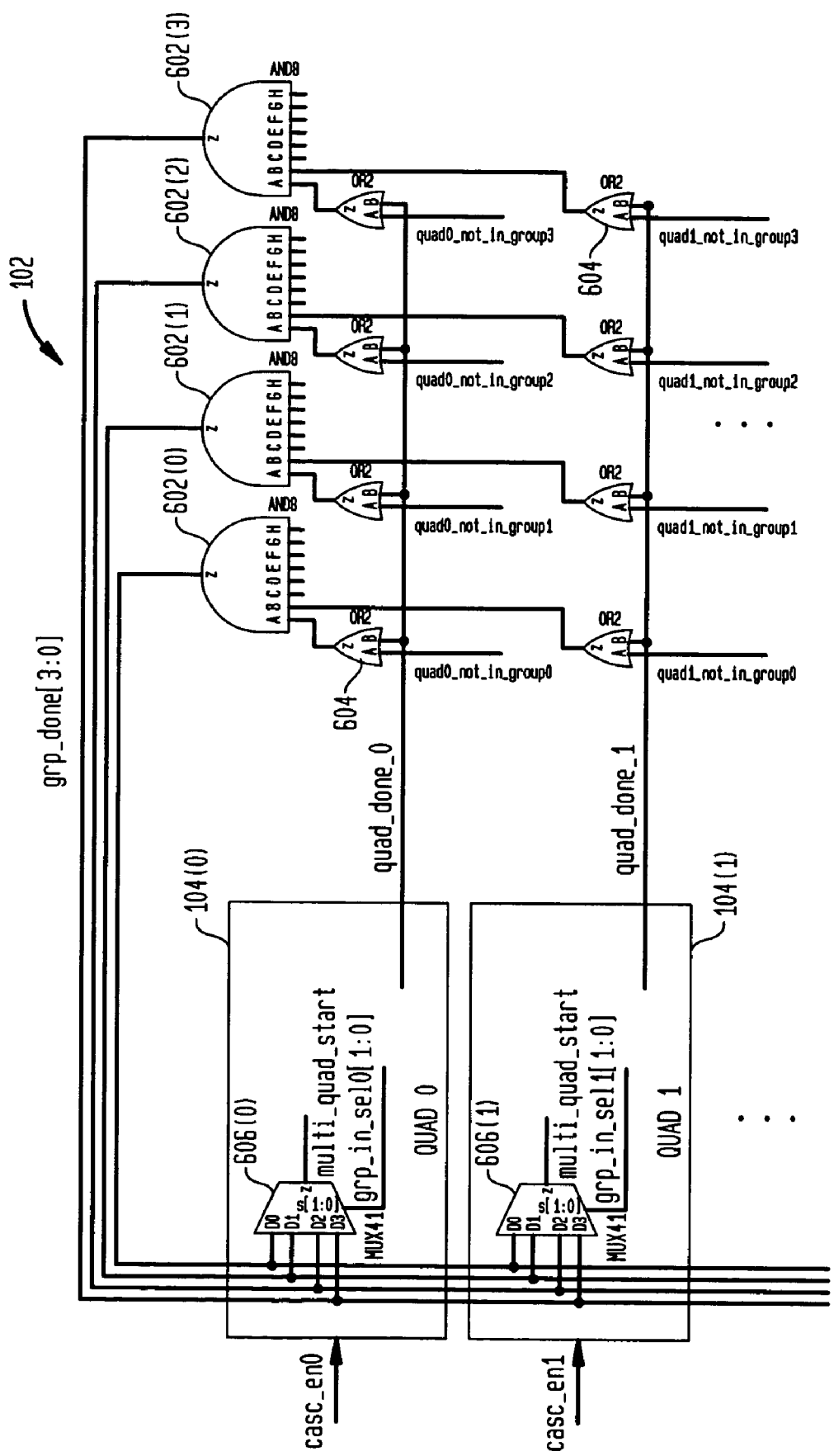
FIG. 6 shows a more-detailed schematic diagram of the circuitry within the controller and the quads of FIG. 1 involved in the generation of the grp_done[3:0] signals.

FIG. 6 shows a more-detailed schematic diagram of the circuitry within controller 102 and quads 104 of FIG. 1 involved in the generation of the grp_done[3:0] signals. In particular, FIG. 6 explicitly shows the circuitry associated with Quad 0 and Quad 1. Although not explicitly depicted, similar circuitry exists for the other six quads.

In addition to signals defined earlier, FIG. 6 also indicates the following signals:

quadx_not_in_groupy: One-bit control signal, where "1" indicates that Quad x is not in Group y. Note that, for a given quad, at most one of the four quadx_not_in_groupy signals can be a "0" at any given time (although all four can be "1"). For example, if quad0_not_in_group0 is "0", then quad0_not_in_group1, quad0_not_in_group2, and quad0_not_in_group3 must all be "1".

multi_quad_done: One-bit control signal, internal to each quad, where, if Quad x is part of a group (as indicated by case_enx="1"), then multi_quad_done="1" indicates that at least one alignment pulse has been received and detected in all of the input channels in that group. If Quad x is not part of a group (as indicated by case_enx="0"), then Quad x ignores the value of multi_quad_done.

To support the generation of the grp_done[3:0] signals, controller 102 has four 8-input AND gates 602(0)-(3) (one for each of the four different possible groups) and thirty-two 2-input OR gates 604 (four for each quad, eight for each group, and only eight of which are explicitly depicted in FIG. 6), and each quad 104 has a (4×1) mux 606.

As shown in FIG. 6, for Quad x, each OR gate 604 receives quad_done_x from Quad x and the corresponding quadx_not_in_groupy. Since, for Quad x, at most one value of quadx_not_in_groupy can be "0", when quad_done_x="1", at most one of the four OR gates associated with Quad x will pass the value of quad_done_x to the corresponding AND gate 602. If all of the eight inputs of an AND gate 602 is "1", then the output of that AND gate will also be "1". Each AND gate 602 generates a different corresponding bit of grp_done[3:0]. Thus, a bit of grp_done[3:0] is asserted when all of the quad_done signals are asserted for the quads in the corresponding group. Within each quad, the four bits of grp_done[3:0] are applied to the four inputs of mux 606, which generates multi_quad_done based on the value of grp_in_selx[1:0].

Figure 7:
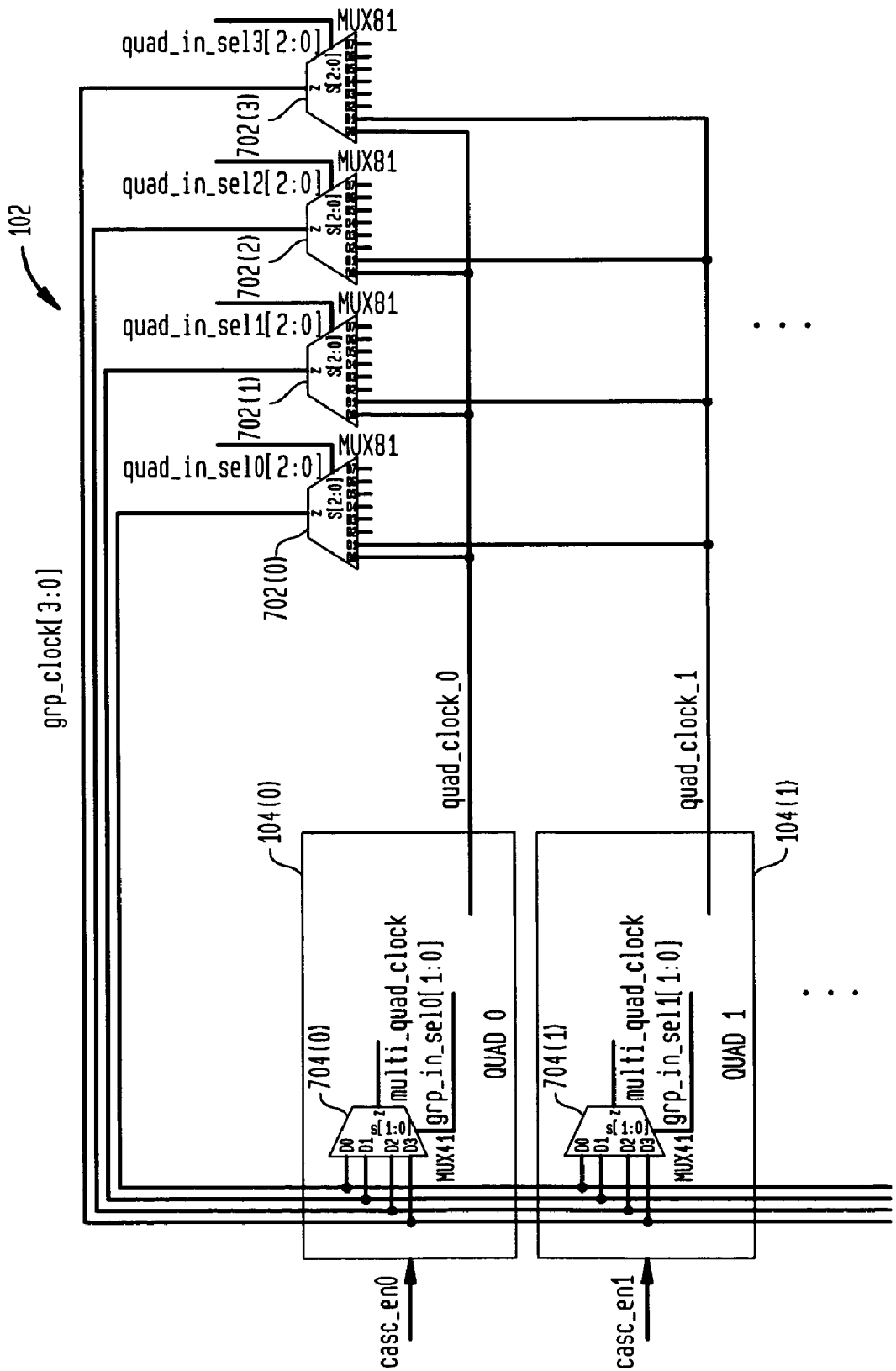
FIG. 7 shows a more-detailed schematic diagram of the circuitry within the controller and the quads of FIG. 1 involved in the generation of the grp_clock[3:0] signals.

FIG. 7 shows a more-detailed schematic diagram of the circuitry within controller 102 and quads 104 of FIG. 1 involved in the generation of the grp_clock[3:0] signals. In particular, FIG. 7 explicitly shows the circuitry associated with Quad 0 and Quad 1. Although not explicitly depicted, similar circuitry exists for the other six quads.

In addition to signals defined earlier, FIG. 7 also indicates the following signal:

multi_quad_clock: Clock signal, internal to each quad, where, if Quad x is part of a group (as indicated by case_enx="1"), then Quad x uses multi_quad_clock to align its four input channels. If Quad x is not part of a group (as indicated by case_enx="0"), then Quad x ignores multi_quad_clock and aligns its four input channels using quad_clock_x.

To support the generation of the grp_clock[3:0] signals, controller 102 has four 8-input muxes 702(0)-(3) (one for each of the four different possible groups), and each quad 104 has a (4×1) mux 704.

As shown in FIG. 7, all eight quad_clock_x signals are applied to the eight inputs of each mux 702, which generates a corresponding clock signal of grp_clock[3:0] based on the value of quad_in_selx[2:0]. Within each quad, the four clock signals of grp_clock[3:0] are applied to the four inputs of mux 704, which generates multi_quad_clock based on the value of grp_in_selx[1:0].

As described previously, channel-alignment circuit 100 of FIG. 1 supports the multitude of synchronization configurations associated with the 22 different operating modes of Table I with only eight 4-channel alignment blocks (i.e., quads 104). To support the same range of synchronization configurations, the prior-art ASIC-based scheme would require 36 channel-alignment blocks: one 32-channel block, one 28-channel block, one 24-channel block, one 20-channel block, two 16-channel blocks, two 12-channel blocks, four 8-channel blocks, eight 4-channel blocks, and sixteen 2-channel blocks. Moreover, in the embodiment of FIG. 1, the same channel-alignment block design can be used for all eight blocks, while, in the equivalent prior-art scheme, nine different channel-alignment block designs are required (one for 32 channels, one of 28 channels, one for 24 channels, one for 20 channels, one for 16 channels, one for 12 channels, one for 8 channels, one for 4 channels, and one for 2 channels).

Channel-alignment circuits of the present invention, such as circuit 100 of FIG. 1, can be (but do not have to be) implemented in a single integrated circuit (IC) chip. Depending on the particular implementation, such a chip may include only ASIC-type circuitry or the chip may include programmable-circuitry, such as FPGA-type circuitry, in addition to ASIC-type circuitry, such as in a field-programmable system chip (FPSC), which includes significant amounts of both ASIC-type and FPGA-type circuitry. In either case, the present invention is preferably (although not necessarily) implemented using ASIC-type circuitry.

The invention can be extended to include configurations of two or more different IC chips, each having its own channel-alignment circuit analogous to circuit 100 of FIG. 1, where the multi-chip configuration supports the synchronization of different channels from different chips in one or more channel groups.

Figure 8:
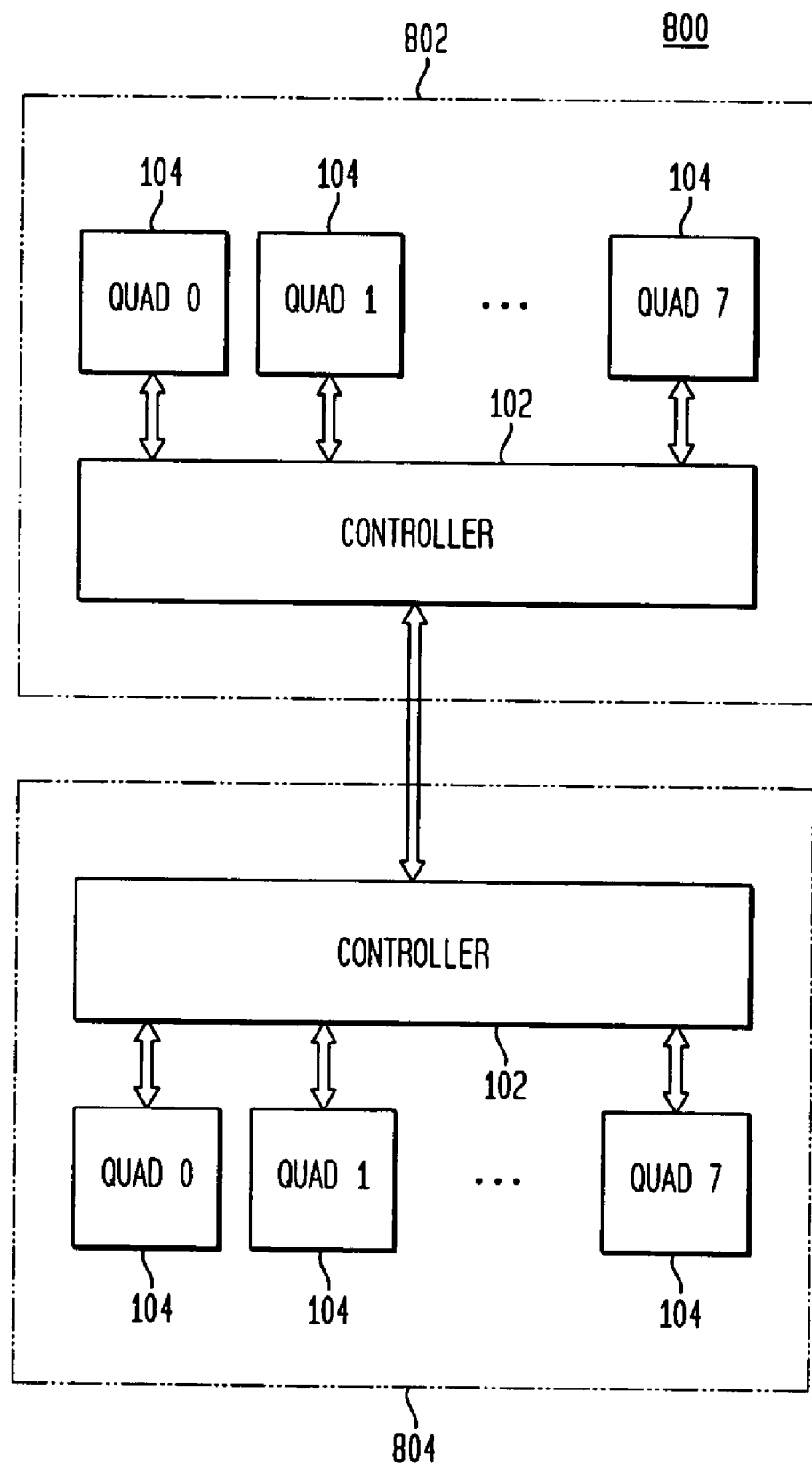
FIG. 8 shows a block diagram corresponding to a configuration in which channel-alignment circuits, each similar to the circuit of FIG. 1, of two different chips are configured to support the synchronization of up to 64 different channels.

FIG. 8 shows a block diagram corresponding to a configuration 800 in which channel-alignment circuits, each similar to circuit 100 of FIG. 1, on two different chips 802 and 804 are configured to support the synchronization of up to 64 different channels. In this case, the controller on one of the chips may be configured to act as the master, and the other controller on the other chip as the slave, in order to coordinate channel-alignment processing across chip boundaries. Such an extension of the invention might involve the definition of additional control and clock signals (such as group alignment signals and group alignment clocks) to pass information between the different chips.

Although the present invention has been described in the context of channel-alignment circuit 100 of FIG. 1 which has eight 4-channel alignment blocks and supports up to four different groups of channels, the present invention can also be implemented in other contexts that differ from the circuit of FIG. 1 in one or more of the following ways:

Channel-alignment circuits having a maximum number of groups other than (i.e., great than or less than) four;

Channel-alignment circuits having a number of channel-alignment blocks other than eight;

Channel-alignment circuits having a number of channels per channel-alignment block other than four; and Channel-alignment circuits where different channel-alignment blocks have different numbers of channels, as opposed to all channel-alignment blocks having the same number of channels. For example, a channel-alignment circuit could have two 8-channel alignment blocks and four 4-channel alignment blocks.

Although the present invention has been described in the context of FPGAs, ASICs, and FPSCs, those skilled in the art will understand that the present invention can be implemented in the context of other types of devices, such as, without limitation, programmable logic devices (PLDs), mask-programmable gate arrays (MPGAs), simple programmable logic device (SPLDs), and complex programmable logic devices (CPLDs).

The present invention may be implemented as circuit-based processes, including possible implementation as a single integrated circuit (such as an ASIC or an FPSC), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A channel-alignment circuit comprising:
   a plurality of channel-alignment blocks, each adapted to synchronize two or more channels; and
   a controller adapted to coordinate the synchronization of channels by the blocks such that:
      channels in each of one or more groups of two or more blocks are synchronized; and
      when there are two or more groups, each group having two or more blocks, each group of blocks is synchronized independently of any other group, wherein:
         the circuit is implemented in a single integrated circuit (IC) chip;
         the circuit is adapted to be configured with one or more other channel-alignment circuits implemented in one or more other IC chips to synchronize channels across chip boundaries; and
         the circuit is adapted to exchange group alignment signals and group alignment clocks with the one or more other channel-alignment circuits to synchronize the channels across chip boundaries.

2. The invention of claim 1, wherein the circuit supports:
   a first operating mode, wherein channels in each of M groups of blocks are synchronized, where $M \geq 1$ and each of the M groups has more than one block; and
   a second operating mode, different from the first operating mode, wherein channels in each of N groups of blocks are synchronized, where $N \geq 1$ and each of the N groups has more than one block.

3. The invention of claim 2, wherein at least one of (i) M does not equal N and (ii) the numbers of blocks in the groups for the first operating mode differs from the numbers of blocks in the groups for the second operating mode.

4. The invention of claim 2, wherein, for a given operating mode, no block is in two or more groups.

5. The invention of claim 2, wherein M does not equal N.

6. The invention of claim 2, wherein the numbers of blocks in the groups for the first operating mode differs from the numbers of blocks in the groups for the second operating mode.

7. The invention of claim 1, wherein:
   the circuit is adapted to simultaneously synchronize up to R different groups of blocks, R>2; and
   the circuit supports:
      a first operating mode involving one group of blocks;
      a second operating mode involving two groups of blocks;
      an (R−1)th operating mode involving R−1 groups of blocks; and
      an Rth operating mode involving R groups of blocks.

8. The invention of claim 1, wherein:
   the circuit supports two or more operating modes having the same number of groups of blocks, but with different numbers of blocks in the groups.

9. The invention of claim 1, wherein each block is adapted to synchronize the same maximum number of channels.

10. The invention of claim 1, wherein:
    there are P blocks, wherein P>2; and
    the circuit supports groups having any of 2 to P blocks in increments of 1.

11. The invention of claim 1, wherein the circuit is adapted to be operated such that each of any one or more blocks synchronizes its channels independent of all other blocks.

12. The invention of claim 1, wherein:
    there are at least eight blocks, each adapted to synchronize up to at least four channels; and
    the circuit supports each operating mode of:
       a first mode in which 8 blocks are part of a first group of synchronized channels;
       a second mode in which 7 blocks are part of a first group of synchronized channels;
       a third mode in which 6 blocks are part of a first group of synchronized channels and 2 blocks are part of a second group of synchronized channels;

a fourth mode in which 6 blocks are part of a first group of synchronized channels;

a fifth mode in which 5 blocks are part of a first group of synchronized channels and 3 blocks are part of a second group of synchronized channels;

a sixth mode in which 5 blocks are part of a first group of synchronized channels and 2 blocks are part of a second group of synchronized channels;

a seventh mode in which 5 blocks are part of a first group of synchronized channels;

an eighth mode in which 4 blocks are part of a first group of synchronized channels and 4 blocks are part of a second group of synchronized channels;

a ninth mode in which 4 blocks are part of a first group of synchronized channels and 3 blocks are part of a second group of synchronized channels;

a tenth mode in which 4 blocks are part of a first group of synchronized channels, 2 blocks are part of a second group of synchronized channels, and 2 blocks are part of a third group of synchronized channels;

a eleventh mode in which 4 blocks are part of a first group of synchronized channels and 2 blocks are part of a second group of synchronized channels;

a twelfth mode in which 4 blocks are part of a first group of synchronized channels;

a thirteenth mode in which 3 blocks are part of a first group of synchronized channels, 3 blocks are part of a second group of synchronized channels, and 2 blocks are part of a third group of synchronized channels;

a fourteenth mode in which 3 blocks are part of a first group of synchronized channels and 3 blocks are part of a second group of synchronized channels;

a fifteenth mode in which 3 blocks are part of a first group of synchronized channels, 2 blocks are part of a second group of synchronized channels, and 2 blocks are part of a third group of synchronized channels;

a sixteenth mode in which 3 blocks are part of a first group of synchronized channels and 2 blocks are part of a second group of synchronized channels;

a seventeenth mode in which 3 blocks are part of a first group of synchronized channels;

a eighteenth mode in which 2 blocks are part of a first group of synchronized channels, 2 blocks are part of a second group of synchronized channels, 2 blocks are part of a third group of synchronized channels, and 2 blocks are part of a fourth group of synchronized channels;

a nineteenth mode in which 2 blocks are part of a first group of synchronized channels, 2 blocks are part of a second group of synchronized channels, and 2 blocks are part of a third group of synchronized channels;

a twentieth mode in which 2 blocks are part of a first group of synchronized channels and 2 blocks are part of a second group of synchronized channels;

a twenty-first mode in which 2 blocks are part of a first group of synchronized channels; and a twenty-second mode in which no 2 blocks are part of any group of synchronized channels.

13. The invention of claim 1, wherein each block is adapted to be configured to synchronize two pairs of channels, wherein, for said each block having first and second pairs of channels, the synchronization of the first pair of channels is independent of the synchronization of the second pair of channels.

14. The invention of claim 1, wherein alignment signals sent by each block in a group are used to align all of the blocks in the group.

15. The invention of claim 14, wherein:
each block is adapted to transmit to the controller:
(1) a block-start signal indicating whether the block has detected an alignment signal in any of the block's input channels;
(2) a block-done signal indicating whether the block has detected an alignment signal in all of the block's input channels; and
(3) a block-clock signal corresponding to a clock signal recovered from one of the block's input channels; and
the controller is adapted to transmit to each block:
(1) a group-start signal indicating whether an alignment signal has been detected in any of the input channels in the group to which the block belongs;
(2) a group-done signal indicating whether an alignment signal has been detected in all of the input channels in the group to which the block belongs; and
(3) a group-clock signal corresponding to the clock signal selected for the group to which the block belongs.

16. The invention of claim 15, wherein:
the controller comprises:
group-start circuitry adapted to (i) receive the block-start signals from all of the blocks and (ii) generate a plurality of group-start signals, each corresponding to a different group;
group-done circuitry adapted to (i) receive the block-done signals from all of the blocks and (ii) generate a plurality of group-done signals, each corresponding to a different group; and
group-clock circuitry adapted to (i) receive the block-clock signals from all of the blocks and (ii) generate a plurality of group-clock signals, each corresponding to a different group; and
each block comprises:
block-start circuitry adapted to (i) receive all of the group-start signals from the controller and (ii) select the group-start signal for the group to which the block belongs;
block-done circuitry adapted to (i) receive all of the group-done signals from the controller and (ii) select the group-done signal for the group to which the block belongs; and
block-clock circuitry adapted to (i) receive all of the group-clock signals from the controller and (ii) select the group-clock signal for the group to which the block belongs.

17. The invention of claim 1, wherein:
each block in each group is adapted to be configured such that any one or more selected channels in the group are disabled, while any remaining channels in the group are enabled; and
the controller is adapted to coordinate the synchronization of all enabled channels in each group.

18. The invention of claim 17, wherein, during synchronization processing of a group:
a block in the group having an enabled first channel is adapted to be re-configured to disable the first channel without adversely affecting the synchronization of other previously enabled channels in the group; and
a block in the group having a disabled first channel is adapted to be re-configured to enable the first channel, wherein any currently enabled channels in the group are automatically re-aligned.

19. The invention of claim 1, wherein the channel-alignment circuit is implemented using ASIC-type circuitry in a field-programmable system chip (FPSC) having programmable circuitry and ASIC-type circuitry.

20. A channel-alignment circuit comprising:
   a plurality of channel-alignment blocks, each adapted to synchronize two or more channels; and
   a controller adapted to coordinate the synchronization of channels by the blocks such that:
      channels in each of one or more groups of two or more blocks are synchronized; and
      when there are two or more groups, each group having two or more blocks, each group of blocks is synchronized independently of any other group, wherein:
         alignment signals sent by each block in a group are used to align all of the blocks in the group;
         each block is adapted to transmit to the controller:
            (1) a block-start signal indicating whether the block has detected an alignment signal in any of the block's input channels;
            (2) a block-done signal indicating whether the block has detected an alignment signal in all of the block's input channels; and
            (3) a block-clock signal corresponding to a clock signal recovered from one of the block's input channels; and
         the controller is adapted to transmit to each block:
            (1) a group-start signal indicating whether an alignment signal has been detected in any of the input channels in the group to which the block belongs;
            (2) a group-done signal indicating whether an alignment signal has been detected in all of the input channels in the group to which the block belongs; and
            (3) a group-clock signal corresponding to the clock signal selected for the group to which the block belongs.

21. The invention of claim 20, wherein:
   the controller comprises:
      group-start circuitry adapted to (i) receive the block-start signals from all of the blocks and (ii) generate a plurality of group-start signals, each corresponding to a different group;
      group-done circuitry adapted to (i) receive the block-done signals from all of the blocks and (ii) generate a plurality of group-done signals, each corresponding to a different group; and
      group-clock circuitry adapted to (i) receive the block-clock signals from all of the blocks and (ii) generate a plurality of group-clock signals, each corresponding to a different group; and
   each block comprises:
      block-start circuitry adapted to (i) receive all of the group-start signals from the controller and (ii) select the group-start signal for the group to which the block belongs;
      block-done circuitry adapted to (i) receive all of the group-done signals from the controller and (ii) select the group-done signal for the group to which the block belongs; and
      block-clock circuitry adapted to (i) receive all of the group-clock signals from the controller and (ii) select the group-clock signal for the group to which the block belongs.

22. The invention of claim 21, wherein:
   in the controller:
      the group-start circuitry comprises a plurality of logical-OR blocks, each corresponding to a different group and each adapted to receive and apply a logical-OR operation to signals corresponding to all of the block-start signals;
      the group-done circuitry comprises a plurality of logical-AND blocks, each corresponding to a different group and each adapted to receive and apply a logical-AND operation to signals corresponding to all of the block-done signals; and
      the group-clock circuitry comprises a plurality of multiplexers, each corresponding to a different group and each adapted to receive all of the block-clock signals and select the block-clock signal corresponding to the group; and
   in each block:
      the block-start circuitry comprises a multiplexer adapted to receive all of the group-start signals and select the group-start signal for the group to which the block belongs;
      the block-done circuitry comprises a multiplexer adapted to receive all of the group-done signals and select the group-done signal for the group to which the block belongs; and
      the block-clock circuitry comprises a multiplexer adapted to receive all of the group-clock signals and select the group-clock signal for the group to which the block belongs.

23. A channel-alignment circuit comprising:
   a plurality of channel-alignment blocks, each adapted to synchronize two or more channels; and
   a controller adapted to coordinate the synchronization of channels by the blocks such that:
      channels in each of one or more groups of two or more blocks are synchronized; and
      when there are two or more groups, each group having two or more blocks, each group of blocks is synchronized independently of any other group, wherein:
         each block in each group is adapted to be configured such that any one or more selected channels in the group are disabled, while any remaining channels in the group are enabled; and
         the controller is adapted to coordinate the synchronization of all enabled channels in each group;
         during synchronization processing of a group:
            a block in the group having an enabled first channel is adapted to be re-configured to disable the first channel without adversely affecting the synchronization of other previously enabled channels in the group; and
            a block in the group having a disabled first channel is adapted to be re-configured to enable the first channel, wherein any currently enabled channels in the group are automatically re-aligned.

* * * * *